United States Patent [19]  
Kiess et al.

[11] Patent Number: 4,557,885  
[45] Date of Patent: Dec. 10, 1985

[54] METHOD OF PRODUCING CAPACITIVE ELECTRONIC DISCS

[75] Inventors: Helmut G. Kiess, Niedersteinmeur, Fed. Rep. of Germany; Bruno K. Binggeli, Arni; Max Derendinger, Zurich, both of Switzerland

[73] Assignee: RCA Corporation, Princeton, N.J.

[21] Appl. No.: 619,929

[22] Filed: Jun. 12, 1984

[51] Int. Cl.[4] .............................................. B29D 17/00
[52] U.S. Cl. ................................... 264/105; 264/107; 427/122
[58] Field of Search ....................... 264/104, 105, 107; 427/25, 122

[56] References Cited

U.S. PATENT DOCUMENTS

| | | | |
|---|---|---|---|
| 3,873,495 | 3/1975 | Appel et al. | 427/25 |
| 4,512,916 | 4/1985 | Datta | 252/511 |
| 4,515,830 | 5/1985 | DiMarco | 427/122 |

Primary Examiner—Donald Czaja  
Assistant Examiner—V. Fischbach  
Attorney, Agent, or Firm—Birgit E. Morris; R. Hain Swope

[57] ABSTRACT

Capacitive electronic discs having thin conductive layers are prepared by coating a core disc with a finely particulate conductive composition comprising a thermoplastic resin, conductive carbon black particles and suitable additives. The powder coating is compressed under heat and pressure to fuse the powder to the surface of the core disc. An information pattern is embossed therein, preferably simultaneously.

14 Claims, No Drawings

METHOD OF PRODUCING CAPACITIVE ELECTRONIC DISCS

This invention relates to improved layered high density information discs and a method for making them.

BACKGROUND OF THE INVENTION

Clemens, in U.S. Pat. No. 3,842,194, discloses a capacitive electronic disc playback system which includes a high density information record having a conductive surface. Initially, information records for this system were sandwich-type construction, i.e. the record was formed of a plastic disc coated with a layer of conductive metal which was in turn coated with a layer of dielectric material, such as a polystyrene. Subsequently, improved information discs for this system were homogeneous and comprised a thermoplastic matrix having finely divided conductive carbon particles embedded therein. In order to make such discs sufficiently conductive to obtain capacitive playback, a fairly high loading of carbon black is required. Formulations presently utilized to prepare capacitive information discs contain about 15 percent by weight of a low density, conductive carbon black in a poly(vinyl chloride)-based resin composition. Suitable molding compositions are disclosed in Martin et al. U.S. Pat. No. 4,228,050. Such formulations contain, in addition to the two principal ingredients, a number of additives such as lubricants, stabilizers, processing aids and the like.

Molding compositions, such as described by Martin et al., are comparatively expensive, due principally to the amount of high quality carbon black contained therein. The number of additives present also contributes to the cost of the disc as each must be separately produced or purchased, checked for purity, stored and the like. It would be beneficial to be able to significantly reduce the amount of carbon black and additives present in the disc without losing the conductivity necessary for capacitive playback of high quality video and/or audio signal information.

A potential means of reducing the carbon black content of a capacitive electronic disc would be to produce a disc having a less expensive plastic central core disc with conductive regions or layers on one or both surfaces. O'Mara, in U.S. Pat. No. 4,390,487, discloses a method of forming such a layered capacitive electronic disc in which the conductive plastic is injected into a compression mold and a nonconductive core material injected inside the conductive material to form a layered preform which is compression molded to form a capacitive electronic disc. Discs made by this process contain up to about 70 percent by weight of nonconductive material.

Ruda, in copending U.S. patent application Ser. No. 522,332, filed Aug. 11, 1983, discloses a layered-type capacitive electronic disc having very thin conductive layers in comparison to those in a disc prepared according to O'Mara. In Ruda, the conductive plastic composition in molten form is made into sheets about 2 to 30 mils thick by passing between rollers in production calendering equipment or in a two-roll mill. Sandwich discs are formed by compression molding a plastic core between two such sheets. The core is comprised of a conventional nonconductive formulation. The conductive composition is, in essence, that described by Martin et al.

Dixon et al., in copending U.S. patent application Ser. No. 556,354 filed on Nov. 29, 1983 and Di Marco, U.S. Pat. No. 4,515,830, disclose processes of forming a layered or sandwich-type capacitive electronic disc utilizing a dispersion of conductive carbon black particles in a solution of a poly(vinylchloride)-based resin. The dispersion in either coated onto a core disc or onto a support surface and dried to form a conductive layer. The layer formed on the support surface is thereafter laminated onto the core disc. The desired information is then embossed into the conductive layer. Although the techniques described by Dixon et al. and Di Marco produce very thin conductive layers, they require the handling of organic solvents with the environmental problems associated therewith.

In accordance with this invention, a method has been formed to prepare layered capacitive electronic discs which is advantageous over previous methodologies.

SUMMARY OF THE INVENTION

In accordance with this invention, capacitive electronic discs ("CEDs") are prepared by coating a core disc with a conductive molding composition in powder form. The powder coating is compressed under heat and pressure to fuse it into a conductive layer. An information track is embossed therein. The compression and embossing procedures are suitably carried out simultaneously. Preferably, the core disc is wetted with a suitable agent that will promote adherence of the powder coating thereto.

DETAILED DESCRIPTION OF THE INVENTION

In general, the conductive powder composition utilized to prepare the layered CEDs of this invention can be a complex composition as disclosed by Martin et al. or an improved composition containing substantially fewer ingredients. Suitable simplified conductive compositions are disclosed in the aforementioned Dixon et al. copending application and Datta, U.S. Pat. No. 4,515,916 and Labib et al., copending application Ser. No. 549,560, filed Dec. 16, 1983.

The resin contained in the conductive layer of the subject layered CEDs can be a homopolymer or copolymer of vinyl chloride, or a mixture thereof as disclosed by Martin et al., a homopolymer of styrene, or an acrylic monomer, or their copolymers as disclosed by Datta et al. in U.S. Pat. No. 4,416,807, or the like. Poly(vinyl chloride) is presently preferred for the subject discs.

Suitable conductive carbon blacks include low density blacks such as Ketjenblack EC of the Armak Company or CSX-200A of Cabot Corporation. Such carbon blacks have a low bulk density, i.e. about 140–160 grams per liter, an average particle size of about 300 angstroms, a high surface area and a high proportion of voids within the particles are measured by dibutylphthalate absorption.

The conductive layers of the CED's of this invention contain from about 70 to 85, preferably from about 75 to 84, percent by weight of the resin and from about 12 to 20, preferably from about 14 to 17, percent by weight of conductive carbon black particles.

The conductive layers of the subject CED's contain up to about 10, preferably from about 1 to 5, percent by weight of additives which are selected from the following groups.

Suitable lubricants include fatty acids such as stearic acid, esters thereof, polyfunctional acid and alcohol esters, soaps including calcium and zinc stearates, fatty acid amides such as stearic acid amide, oleamide and ethylene-bis-stearamide, silanes such as dimethylsiloxane, commercial mixed organic ester preparations such as Loxiol 7109 available from Henkel International Gmbh, and the like. The conductive layers suitably contain from about 0.5 to about 3 percent by weight of the lubricant when it is present.

The conductive layers of the subject layered CEDs may contain one or more stabilizers which are suitably organo-metallic compounds derived from metals including tin, lead, zinc, barium and cadmium, such as dibutyltin-$\beta$-mercaptopropionate, dibutyltin maleate and the like. Epoxides, phosphites and alkylated phenols such as t-butylcatechol can also be employed. Generally, these stabilizers are employed in a minor amount, i.e., about 1 to about 4 percent by weight of the total molding composition. The amount of stabilizer present will depend on the particular resin used and the stabilizer itself. A preferred stabilizer is dibutyltin-$\beta$-mercaptoproprionate available from M & T Chemicals, Inc. under the trademark T-35. The stabilizers act primarily to neutralize volatiles formed as decomposition products of the resin.

Other additives may include acrylic flow modifiers, solid or liquid plasticers such as diundecyl phthalate, a titanate dispersant, i.e. tri(dioctylpyrophosphato)titanate, an organo-silicone having polar groups, e.g. 1,3-bis(4-hydroxybutyl)-1,3-didecyldimethyldisiloxane or a polyalkylene oxide modified dimethyl polysiloxane available from Union Carbide Corporation as UL-722, and the like. Suitably, these additives, when present, are in the conductive layer in from about 0.5 percent by weight for an individual compound to about 4 percent by weight for the total of members of the group.

The solid ingredients of the conductive molding composition are comminuted together, individually or in groups of two or more and thoroughly blended in a suitable apparatus. The pulverizing procedure may be carried out separate from or ancillary to blending of the solid ingredients. The liquid ingredients added thereto, preferably by spraying as an ultrafine mist. The mixture is blended until the temperature reaches 170° F.(76.7° C.). The mixture is then thermally processed, i.e. it is heated under high shear to form a melt having the carbon particles uniformly dispersed therein. Thermal processing is suitably carried out by extruding the conductive composition in a Buss Condux Kneading Extruder, or other suitable apparatus. The composition is passed through a die, pelletized and stored.

The pelletized composition is comminuted so that it contains no particles larger than about 200 micrometers, with a substantial proporation, i.e. at least about 70 percent by weight, smaller than about 25 micrometers. Commercial grinding apparatus such as air jet pulverizers is suitable for this purpose. The subject CEDs are prepared by coating one or both surfaces of a core disc with a thin, uniform coating of the powdered conductive molding composition. The coated discs are then compressed under heat and pressure to fuse the powder coating into a conductive layer. Simultaneously, or as a separate procedure, an information track is embossed into each conductive layer. Although thermal processing of the conductive composition is preferred, a simplified formulation may be blended and coated directly onto the core. As disclosed by Dixon et al., most of the additives disclosed by Martin et al. and Ruda can be eliminated from such a formulation.

The powdered conductive composition is applied to the core disc by any technique which will deposit a uniform coating of powder onto a flat substrate. The powder composition may be applied mechanically by conventional procedures such as uniformly spreading onto the surface with a doctor blade, a multiple roller mechanism or other similar device. Preferably, however, the core disc is electrostatically coated with the powdered conductive composition. The surface of the disc may be charged, e.g. by a corona discharge, with a force opposite to that placed on the powdered conductive composition, the powder thus being attracted to the disc surface. It is, of course, critical to such applications that the powdered conductive composition from which such coatings are drawn be continually mixed and in motion. This can be accomplished by conventional apparatus such as a vibrator or, preferably, air jets.

The core disc may be coated with powdered conductive composition on one side, both sides sequentially, or both sides simultaneously from reservoirs of charged powdered composition placed on opposite sides of the core disc. Generally, from about 0.5 to about 15, preferably about 2, grams of powdered conductive composition are applied to the core disc. This will produce, upon compression, conductive layers between 10 and 300, preferably between about 20 and 150, micrometers in thickness.

It has been found in accordance with this invention that adherence of the powder coating to the core disc is materially increased by wetting the core disc. A suitable preparation for this purpose is a liquid lubricant of the type used to lubricate the surface of conventional CEDs. Suitable lubricants include fractionated methylalkyl siloxane preparations such as are disclosed in U.S. Pat. No. 4,275,101, issued June 23, 1981, preferably doped with an additive such as disclosed in U.S. Pat. No. 4,330,583, issued May 18, 1982, or U.S. Pat. No. 4,355,062, issued Oct. 19, 1982. This composition is suitably applied to the core disc by spin coating.

In addition to increasing adherence of the powder conductive molding composition to the core disc, the lubricants discussed above also function in other ways in the preparation of the subject CEDs. The lubricants function as release agents to aid in a clean separation of the finished disc from the mold; they increase the viscosity of the core disc as will be discussed below; and lastly, they have a tendency to bleed to the surface to lubricate the disc and minimize stylus wear. However, it is preferred to lubricate the surface of the finished disc by application of an additional coating of one of the above lubricants, suitably as a fine mist.

The powder coated core disc may be handled with virtually no loss of powder. In order to prevent possible powder loss in a manufacturing environment, the surface of the coated disc is heated, suitably by irradiation with a high intensity lamp to fuse at least the outer portion of the powder layer. Suitably, the powder layer is flood irradiated for a few seconds so that at least the outer portion thereof is heated to a temperature of from about 150° to 180° C.

The plastic core disc for the subject sandwich-type CEDs is suitably comprised of a rigid vinyl chloride homopolymer-based formulation. Such compositions typically contain, in addition to the polymer, lubricants, plasticizers, stabilizers and the like. Due to the thinness of the conductive layers of the subject CEDs, it is important that the core disc have a smooth surface. It is also important that the viscosity of the core be greater than that of the conductive layers.

It has been found that it is necessary that the core disc, or at least the surface thereof, have a greater viscosity than the powdered conductive composition. Were this not so, the conductive composition, particularly the carbon black particles, would penetrate into the core disc during the compression and embossing procedures. As such penetration would not occur uniformly, the result would be an adverse effect on capacitive playback of the finished CED.

In addition to utilizing a polymer material having a high viscosity, the necessary viscosity of the core disc can be suitably attained by adding a filler thereto, or by treating the surface thereof. The addition of the filler material is advantageous as it generally will reduce the cost of the finished disc. Suitable filler materials include titanium dioxide, carbon black, alumina and the like. The core disc suitably contains from about 3 to about 15 percent by weight of such filler materials. The surface of the core disc may also be treated by conventional means such as radiation hardening to produce the same effect. It is preferred to increase the viscosity of the disc itself because hardening of the surface can make it more difficult to bond the conductive layers thereto.

The core discs coated with the powdered conductive molding composition in accordance with this invention are compressed and molded in conventional equipment. Compression under heat and pressure may be carried out as a separate precedure, or be combined with embossing in molding apparatus utilized to produce present commercial CEDs.

The following Example further illustrates this invention, it being understood that the invention is in no way intended to be limited to the details described therein. In the Example, all parts and percentages are on a weight basis and all temperatures are in degrees Celsius, unless otherwise state.

EXAMPLE 14.75 Parts of conductive carbon black CSX200A of the Cabot Corporation, comminuted to reduce the particle size of the agglomerates to under 40 micrometers, was combined with 78 parts of Geon 110x346 poly(vinyl chloride) resin of the B.F. Goodrich Co.; 0.75 part of Loxiol 1709, a mixed organic ester lubricant of the Henkel Company; 2.5 parts of T-35; and 1.0 part of Acryloid K-175, an acrylic processing aid and high temperature lubricant available from Rohm & Haas Company, similarly ground, and mixed until throughly blended. The following liquid ingredients were added to the blended solid ingredients as a fine spray: 1.0 part of dibutyltin maleate stabilizer, Mark 275 of Argus Chemical Company; and 2.0 parts of diundecyl phthalate (DUP) plasticizer. Mixing was continued until the temperature of the mixture reached 235° F. (113°). The mixture was cooled to ambient, fed to a Buss Condux Kneading Extruder and melt-extruded in the form of a pelletized molding composition. The pelletized conductive molding composition was comminuted in an air jet pulverizer to form a powder having a particle size under such that no particle was larger than about 200 micrometers, and at least about 70 percent by weight were smaller than 25 micrometers.

The powdered conductive molding composition was placed in two plastic reservoir containers having conventional vibrator means sufficient to continually mix the contents. Each container had a slot opening 1 mm in height and 10 cm in width. The width of the opening corresponded to the width of the ring-shaped area of a commercial capacitive electronic disc wherein the information is embossed. A metal strip forming the bottom of the slot on one of the containers was connected to a high voltage electrical source. The corresponding strip on the other container was connected to ground. The slots were positioned to be facing each other and separated by a distance of about 10 mm.

A core disc was mounted on a motor driven spindle so that a radius thereof extended the length of the slots in the containers. The core disc had an average thickness of about 2 mm and was comprised of a rigid poly(vinyl chloride) homopolymer-based formulation containing 3.3 percent of titanium dioxide as a filler additive. The surface of the core disc was coated with a doped, fractionated methylalkyl siloxane lubricant such as disclosed in U.S. Pat. No. 4,355,062. The lubricant was applied by spin-coating. A bias of 1000 volts was applied to the first metal strip and both powder reservoirs were continually mixed by agitation as the core disc was slowly rotated so that the entire playing surface passed between the slots. The coating procedure was carried out for about 10 to 20 seconds during which a coating of conductive molding composition 50 micrometers thick was simultaneously deposited on both surfaces of the core disc. The coating was uniform and adhered very well to the disc surface. With proper handling, no powder was lost from the disc surface.

The powder coated discs were carefully placed into a conventional compression molding apparatus and molded at 190° to solidify the conductive layer and emboss an information track therein. The resulting CEDs produced a commercially acceptable picture on playback utilizing a commercial playback apparatus.

The discs were consistently found to be somewhat more conductive than CEDs produced by the conventional procedure described in Martin et al. U.S. Pat. No. 4,228,050. It is believed that the increased conductivity is the result of there being no appreciable flow of material during the molding step. In contrast, in the process of Martin et al. CEDs are compression molded from a preform puck. Therefore, the carbon black particles in the subject CEDs are more isotropically oriented, whereas those in a conventional CED are anisotropically oriented. Hence, the difference in conductivity. The lack of flow in the molding process of this invention produces a marked improvement in the useful life of expensive stampers.

We claim:

1. A method of forming a conductive, high density information disc suitable for capacitive readout which comprises:
   (a) providing a homogeneous powder composition comprising a homopolymer or copolymer of vinyl chloride, sufficient finely divided particulate conductive carbon black to provide capacitive readout, stabilizers, processing aids and lubricants compatible therewith, said composition having no particles larger than about 200 micrometers and at least about 70 percent by weight smaller than about 25 micrometers;
   (b) coating the powder onto at least one surface of a core disc, said core disc having a viscosity substantially greater than that of the powder composition to substantially prevent diffusion of the powder composition into the core disc during compressing and embossing;

(c) compressing the disc under heat and pressure to fuse the powder coating into a conductive layer; and (d) embossing an information track therein.

2. A method in accordance with claim 1, wherein the core disc is electrostatically coated with the powder composition.

3. A method in accordance with claim 2, wherein a surface of the core disc and the powder are oppositely charged and placed in proximate relation such that the disc is coated with the powder.

4. A method in accordance with claim 1, wherein both surfaces of the disc are coated.

5. A method in accordance with claim 4 wherein both surfaces of the disc are coated simultaneously.

6. A method in accordance with claim 5, wherein two sources of powder are placed in proximate relation with the core disc interposed between them such that the disc is coated with the powder.

7. A method in accordance with claim 1, wherein the composition contains a homopolymer of vinyl chloride.

8. A method in accordance with claim 1, wherein the surface of the core disc is coated with a suitable liquid lubricant composition prior to coating with the powder composition.

9. A method in accordance with claim 7, wherein the lubricant composition comprises a fractionated methyl alkyl siloxane lubricant.

10. A method in accordance with claim 1, wherein steps (c) and (d) are carried out simultaneously.

11. A method in accordance with claim 1, wherein said composition is thermally processed by heating under high shear to form a melt having the carbon particles uniformly dispersed therein prior to being comminuted to form said homogeneous powder.

12. A method in accordance with claim 11, wherein said composition is thermally processed by passing through an extruder.

13. A method in accordance with claim 1, including the additional step of treating the coated disc formed in step (b) to fuse at least the surface of the powder coating thereby preventing loss of powder during handling.

14. A method in accordance with claim 13, wherein the coated disc is irradiated with a high intensity lamp for a time sufficient to raise the temperature of at least the surface of the powder coating to from about 150° C. to about 180° C.

* * * * *